United States Patent
Emelyanov et al.

(10) Patent No.: US 10,365,948 B1
(45) Date of Patent: *Jul. 30, 2019

(54) IMPLEMENTING A HOST AS A CONTAINER OR VIRTUAL MACHINE

(71) Applicant: Virtuozzo International GmbH, Schaffhausen (CH)

(72) Inventors: Pavel Emelyanov, Moscow (RU); Andre Moruga, Woodinville, WA (US); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 158 days.

This patent is subject to a terminal disclaimer.

(21) Appl. No.: 15/694,977

(22) Filed: Sep. 4, 2017

Related U.S. Application Data

(63) Continuation-in-part of application No. 15/061,630, filed on Mar. 4, 2016, now Pat. No. 9,753,762.

(51) Int. Cl.
  *G06F 9/455* (2018.01)
  *G06F 9/48* (2006.01)
  *H04L 29/06* (2006.01)

(52) U.S. Cl.
  CPC ........ *G06F 9/4856* (2013.01); *G06F 9/45554* (2013.01); *G06F 9/45558* (2013.01); *G06F 2009/4557* (2013.01); *G06F 2009/45587* (2013.01); *G06F 2009/45595* (2013.01); *H04L 63/08* (2013.01)

(58) Field of Classification Search
  None
  See application file for complete search history.

(56) References Cited

U.S. PATENT DOCUMENTS

| 8,949,825 | B1 | 2/2015 | Fitzgerald |
| 2012/0272015 | A1 | 10/2012 | Fahrig |
| 2014/0282525 | A1 | 9/2014 | Sapurarn |

OTHER PUBLICATIONS

Lee, Micah, "With Virtual Machines, Getting Hacked Doesn't Have to be That Bad", Sep. 16, 2015, https://theintercept.com/2015/09116/getting-hacked-doesnt-bad/, pp. 1-26.

*Primary Examiner* — Gregory A Kessler
(74) *Attorney, Agent, or Firm* — Baardmesser Law Group

(57) ABSTRACT

A computer-implemented system for migration of a host Virtual Execution Environment (VEE), including a first VM running in a public cloud; the first VM having a first thin guest OS and a first file system; a dedicated hosting VEE on the first VM and executing user applications; a first dispatcher module running inside the dedicated hosting VEE, the first dispatcher module accessible to a user of the dedicated hosting VEE; a second dispatcher module running inside the first VM, the second dispatcher module in communication with the first dispatcher. The second dispatcher module is configured to live-migrate the dedicated hosting VEE with the executing user applications from the first VM to a second VM running on another public cloud, such that the migration is transparent to the dedicated hosting VEE.

24 Claims, 6 Drawing Sheets

IMPLEMENTING A HOST AS A CONTAINER OR VIRTUAL MACHINE

CROSS REFERENCE TO RELATED APPLICATIONS

This application is a continuation in part of U.S. patent application Ser. No. 15/061,630, filed on Mar. 4, 2016, incorporated herein by reference in its entirety

BACKGROUND OF THE INVENTION

Field of the Invention

This invention relates to a method for implementing a host as a Container or Virtual Machine (VM), and for migrating a Virtual Execution Environment from one host to another host, including to a public cloud.

Description of the Related Art

A modern trend of virtualization presents some challenges with regard to isolation of host which creates Virtual Machines (VMs) or Containers. In conventional systems, a host has some security vulnerabilities. This is illustrated by an example depicted in FIG. 1. A host 110 has Linux™ OS 160 running on it. A dispatcher module 170 is configured to create VMs 130 or Containers 120. An administrator can connect to the dispatcher and send commands for creation/deletion of VMs and Containers. The dispatcher can also route requests to a web server 140 or use it for providing an interface to the dispatcher module 170.

However, if an intruder gains access to the host 110 through a remote shell access point and launches an application 150, this application can compromise the entire host 110, because it can see all of the VMs 130 and the Containers 120. Furthermore, the application 150 can operate at a root privilege level, which means it can perform any actions on the host 110. Additionally, an intrusion can occur through the web server 140 interface, which is even more vulnerable. This security vulnerability of the conventional Linux™ host, which hosts a dispatcher module, needs to be addressed.

Accordingly, a method for implementing a host as secure container or VM, and for migrating that container or VM, is desired.

SUMMARY OF THE INVENTION

Accordingly, the present invention is directed to a method for improving a security of a host, and in particular, implementing a host as a Container or VM, and to migrating the host, that substantially obviates one or more of the disadvantages of the related art.

In one aspect of the invention, one of the Containers (or VMs) is allocated for hosting a dispatcher module in an isolated environment. A truncated (thin) dispatcher 2 version still runs on the host OS, while another secured dispatcher module 1 runs inside the allocated Container. This way, if an intruder gains access to the Linux host, he would not be able to send commands to the dispatcher module 1 running inside the Container. The intruder may access the thin dispatcher 2 module, but would not be able to create or delete VMs or Containers. The administrator can connect directly to the dispatcher module inside the container. According to the exemplary embodiment, a remote shell access goes to the host container instead of a physical host. Thus, the security of the host is, advantageously, improved.

In another embodiment, a computer-implemented system for migration of a Virtual Execution Environment (VEE) includes a host having a thin host OS and a host file system; a Virtual Machine (VM) running on the host; a dedicated hosting VEE running in the VM and executing user applications; and a dispatcher module running inside the dedicated hosting VEE and configured to live-migrate the dedicated hosting VEE with the executing applications from the host to another host.

Optionally, the system includes a module for administration of other VEEs that is implemented inside the dedicated hosting VEE, while its functionality is supported by the host. Optionally, the administration includes installing software applications inside other VEEs running under the VM. Optionally, the administration includes setting up networking parameters of other VEEs running under the VM. Optionally, the administration includes creating nested VEEs. Optionally, the administration includes licensing management for software installed in other VEEs running under the VM.

The dedicated hosting VEE can be a VM or a Container. Optionally, the system includes a template module for creation of other VEEs that is implemented inside the dedicated hosting VEE. Optionally, the system includes a backup module. Optionally, the thin host OS is a minimum LINUX OS comprising a basic kernel, low level libraries GLib and NetConfig. Optionally, dispatcher processes executing inside the dedicated hosting VEE are isolated from other processes of Containers and VMs residing on the same host. Optionally, the system includes a user authentication module implemented inside the dedicated hosting VEE. Optionally, an administrator can connect directly to the dispatcher module, and a remote shell access goes to the dedicated hosting VEE instead of a physical host.

Optionally, the dispatcher module is not accessible by applications running on the host or running in the VM outside the dedicated hosting VEE. Optionally, the system includes a second dispatcher module running inside the VM and outside the dedicated hosting VEE, the second dispatcher module being in communication with the dispatcher module inside the dedicated hosting VEE, and the second dispatcher module being configured to execute the live migration transparently to the dedicated hosting VEE.

Optionally, the another host is a public cloud. Optionally, the dedicated hosting VEE is permitted to consume all the memory available to the VM.

In another embodiment, a computer-implemented method for migration of a host Virtual Execution Environment (VEE), including the steps of on a host having a Virtual Machine (VM) with a thin guest OS and a guest file system, starting a dedicated hosting VEE under the VM; starting a first dispatcher module inside the dedicated hosting VEE, wherein the dispatcher module is configured to interface to an administrator; starting user applications in the dedicated hosting VEE; and starting a second dispatcher module configured to live-migrate the dedicated hosting VEE with the executing applications to a host on a cloud.

Optionally, the first and second dispatcher modules are not accessible by applications running on the host. Optionally, the first and second dispatcher modules are not accessible by applications running in the VM and outside the dedicated hosting VEE.

In another embodiment, a computer-implemented system for migration of a dedicated Virtual Execution Environment (VEE) includes a first VM running in a public cloud; the first VM having a first thin guest OS and a first file system; a dedicated hosting VEE running on the first VM and executing user applications; a first dispatcher module running inside the dedicated hosting VEE, the first dispatcher module accessible to a user of the dedicated hosting VEE; a second dispatcher module running inside the first VM, the second dispatcher module in communication with the first dispatcher module. The second dispatcher module is configured to live-migrate the dedicated hosting VEE with the executing user applications from the first VM to a second VM running on another public cloud, such that the migration is transparent to the dedicated hosting VEE. Optionally, the second VM has a second thin guest OS and a second file system. Optionally, the first dispatcher module is not accessible by the user applications running in the first VM.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
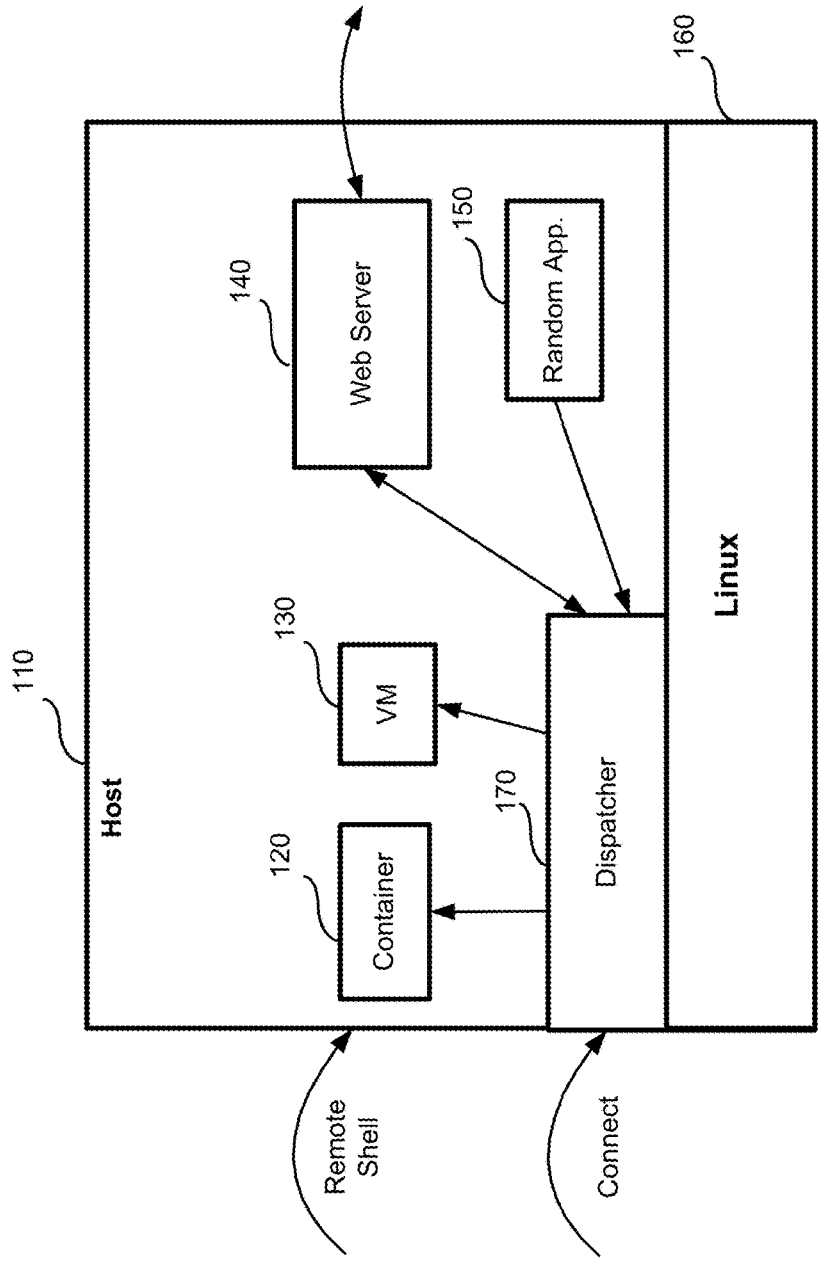
FIG. 1 illustrates a conventional host with a dispatcher.

Reference will now be made in detail to the preferred embodiments of the present invention, examples of which are illustrated in the accompanying drawings.

The present invention is directed to a method for creation, launching and migration of application Containers inside the OS Container or a VM. The following definitions are used throughout the description.

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Virtual Private Server (VPS), is one type of a Virtual Execution Environment (VEE) running on the same hardware system with a single shared OS kernel and sharing most of the system resources, where isolation of Virtual Execution Environments is implemented on a namespace level. A Virtual Private Server (VPS), often referred to as a "Container," is a closed set, or collection, of processes, system resources, users, groups of users, objects and data structures. Each VPS has its own ID, or some other identifier, that distinguishes it from other VPSs. A container acts as an isolated virtual server within a single machine, where multiple sets of application services are organized on a single hardware node by placing each into an isolated virtual Container.

The VPS/Container offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc. In other words, the full range of system administrator functions is desirable, as if the VPS were a dedicated remote server, with the existence of the VPS being transparent from the perspective of both the VPS user and the VPS administrator.

In one embodiment, a hardware node has LINUX OS installed on it with a set of files. The LINUX OS (or another OS) may be a thin OS—i.e., an OS with a smaller footprint than a standard operating system. This is usually achieved by removing many or most of the user interface functions, games and utilities that would not be utilized by the components that are expected to run on the system. A system has a dispatcher configured to create VMs and Containers by direct interaction with the host OS. The dispatcher is configured to build Containers only based on disk images created by the driver of the main file system. The dispatcher can work with any disk images using additional verification of these images—i.e., who created the image, when, access permissions, etc. The host can have several VMs and Containers running on it. Each Container has its own virtual disk and a file system implemented on the virtual disk, which has its image located in the main file system. In order for a user to create a VM or a Container, the user has to address the dispatcher directly under control of the administrator.

According to the exemplary embodiment, one of the Containers is allocated for hosting a dispatcher module in an isolated environment. A truncated (thin) dispatcher 2 version still runs on the host OS, while another secure dispatcher module 1 runs inside the allocated Container. This way, if an intruder gains access to the Linux™ host, it would not be able to send commands to the dispatcher module 1 running inside the Container. The intruder may access the dispatcher 2 module, but would not be able to create or delete VMs or Containers. The administrator can connect directly to the dispatcher module inside the container. According to the exemplary embodiment, a remote shell access goes to the host container instead of a physical host. Thus, the security of the host is, advantageously, improved.

Figure 2:
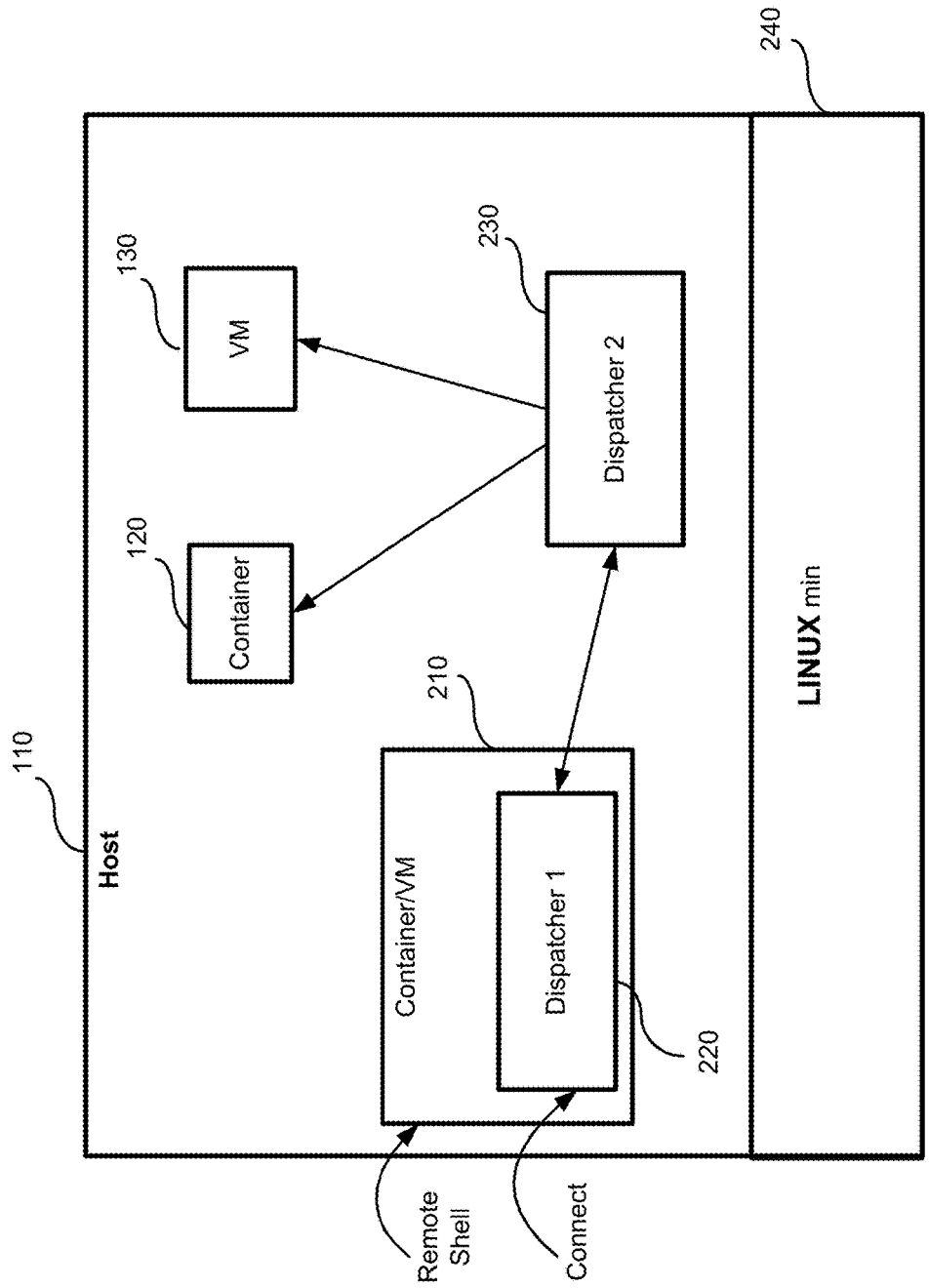
FIG. 2 illustrates a host container running a dispatcher module in an isolated environment, in accordance with the exemplary embodiment.

FIG. 2 illustrates a host VEE in a form of a container running a dispatcher module in an isolated environment, in accordance with the exemplary embodiment. A LINUX™ host runs a minimal version of the LINUX OS 240. This version only includes basic kernel, low level libraries—GLib, NetConfig and a thin (truncated) dispatcher module 230.

A Container 210 is allocated for running a dispatcher module 220, which includes Container/VM creation functionality, in an isolated environment. In one embodiment, the dispatcher module 220 can run inside a dedicated Container or VM 210 implemented on the physical host 110. Thus, the truncated dispatcher 230 still runs on the host OS for managing the existing VMs 130 and Containers 120, while another secured dispatcher module 210 runs inside the allocated Container 210. This way, if an intruder gains access to the Linux™ host, it would not be able to send commands to the dispatcher module 210 running inside the Container. The intruder may access the dispatcher module 230, but would not be able to create or delete VMs 130 or Containers 120. The administrator can connect directly to the dispatcher module 220 inside the container. According to the exemplary embodiment, a remote shell access goes to the host Container 210 instead of a physical host 110. Thus, the security of the host is, advantageously, improved.

Figure 3:
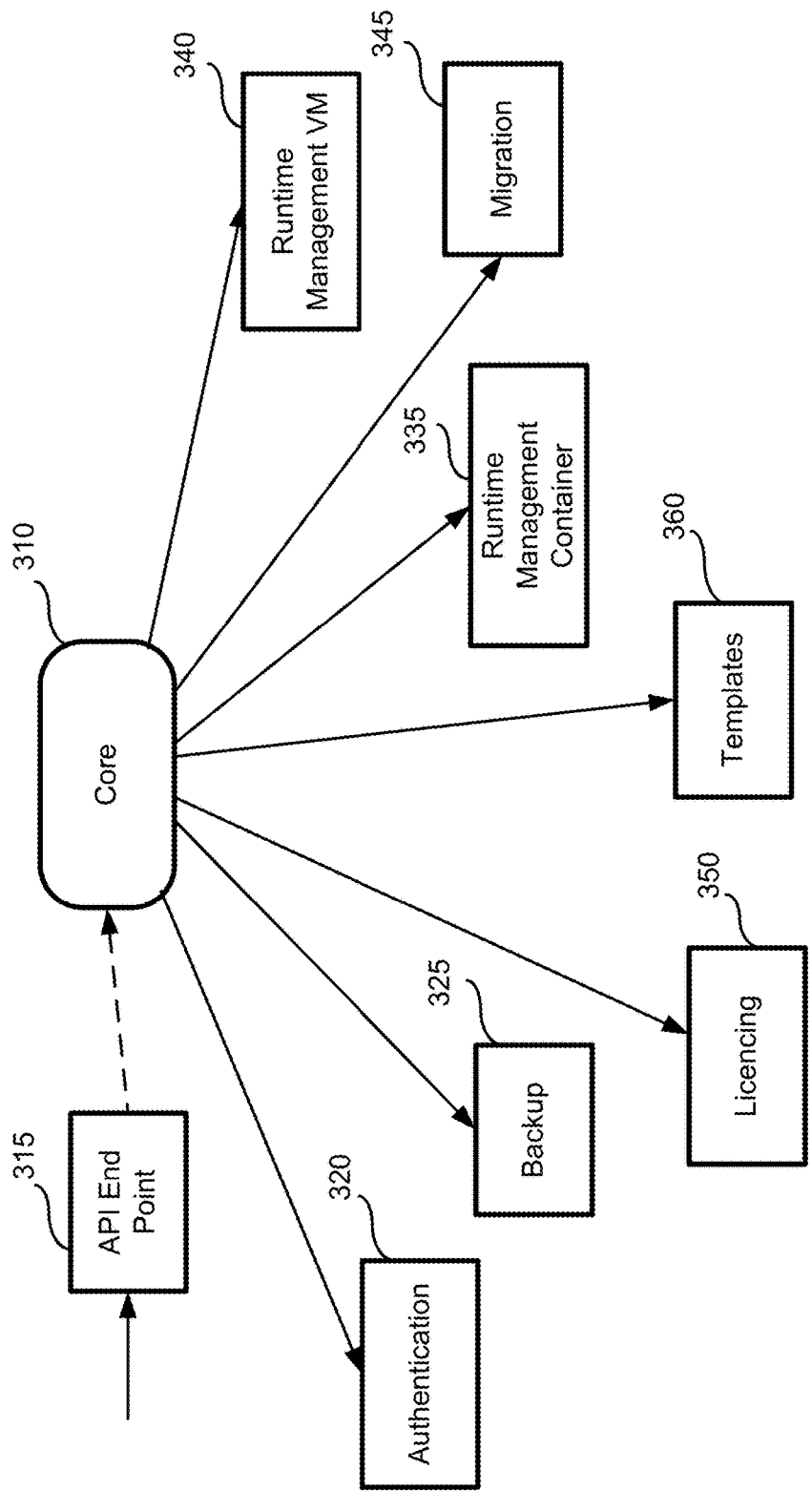
FIG. 3 illustrates components of the dispatcher module that are placed inside the Container, in accordance with the exemplary embodiment.

FIG. 3 illustrates components of the dispatcher module that are placed inside the Container, in accordance with the exemplary embodiment. A user connects to the dispatcher over an API end point 315 that can be encapsulated inside the Container/VM 210 (see FIG. 2). The dispatcher core 310 can include authentication module 320. The user can enter login/password and get authenticated inside the Container/VM 210. According to the exemplary embodiment, the following dispatcher sub-modules can also implemented inside the hosting container: a backup module 325, a licensing module 350, a migration manager 345 and a template module 360.

A runtime Container manager 335 and a runtime VM manager 340 are implemented on the host 110 (see FIG. 2). Alternatively, a backup module 325, a migration manager 345 and a template module 360 can be implemented inside the service container, while some of their functionality is provided by the host 110. Therefore, some of the dispatcher functionality can be performed inside the service container, without compromising the host. Note that if the minimal LINUX is run on the host, the remaining LINUX functionality is added to the host container. This way the administrators can install their software inside the host service container instead of compromising the host.

Figure 5:
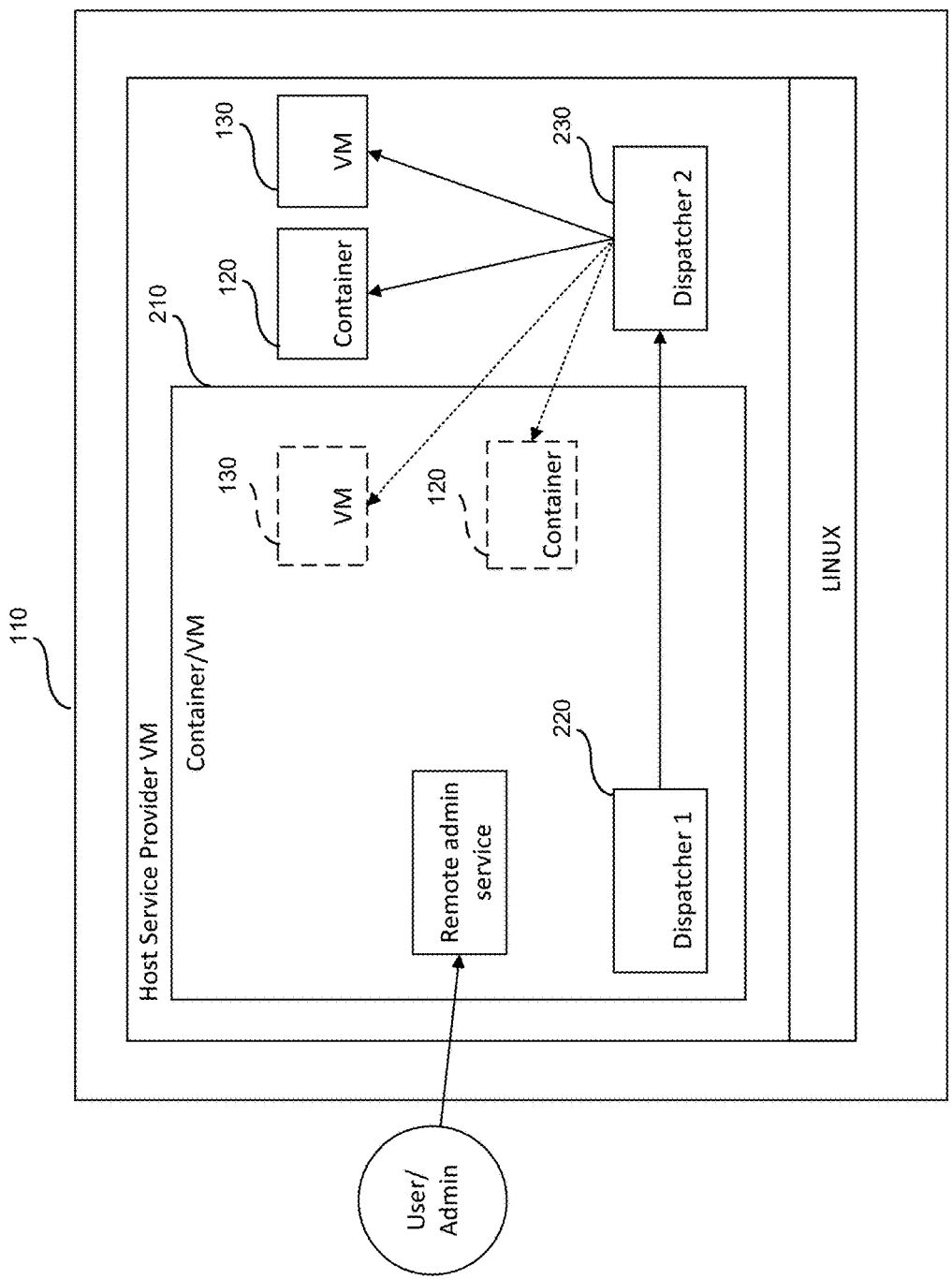
FIG. 5 illustrates the use of a dedicated Virtual Execution Environment (VEE) to create other VEEs upon user or admin request.

As a further option, as illustrated in FIG. 5, the dedicated VEE, which can create other VEEs upon user or admin request, can be given additional privileges, such as to install additional software inside itself or inside other VEEs, configure its own networking or the networking of other VEEs, create VEEs (e.g., containers or VMs) inside itself or inside other VEEs (i.e., nested containers, where one container is nested within another container). The creation of all other VEEs on the hardware node may be prohibited without permission from the dedicated VEE. The dedicated VEE can create resource limitations for the VEs and also the dedicated VEE can occupy all the free node resources (or, the resources left from the thin management module).

Figure 6:
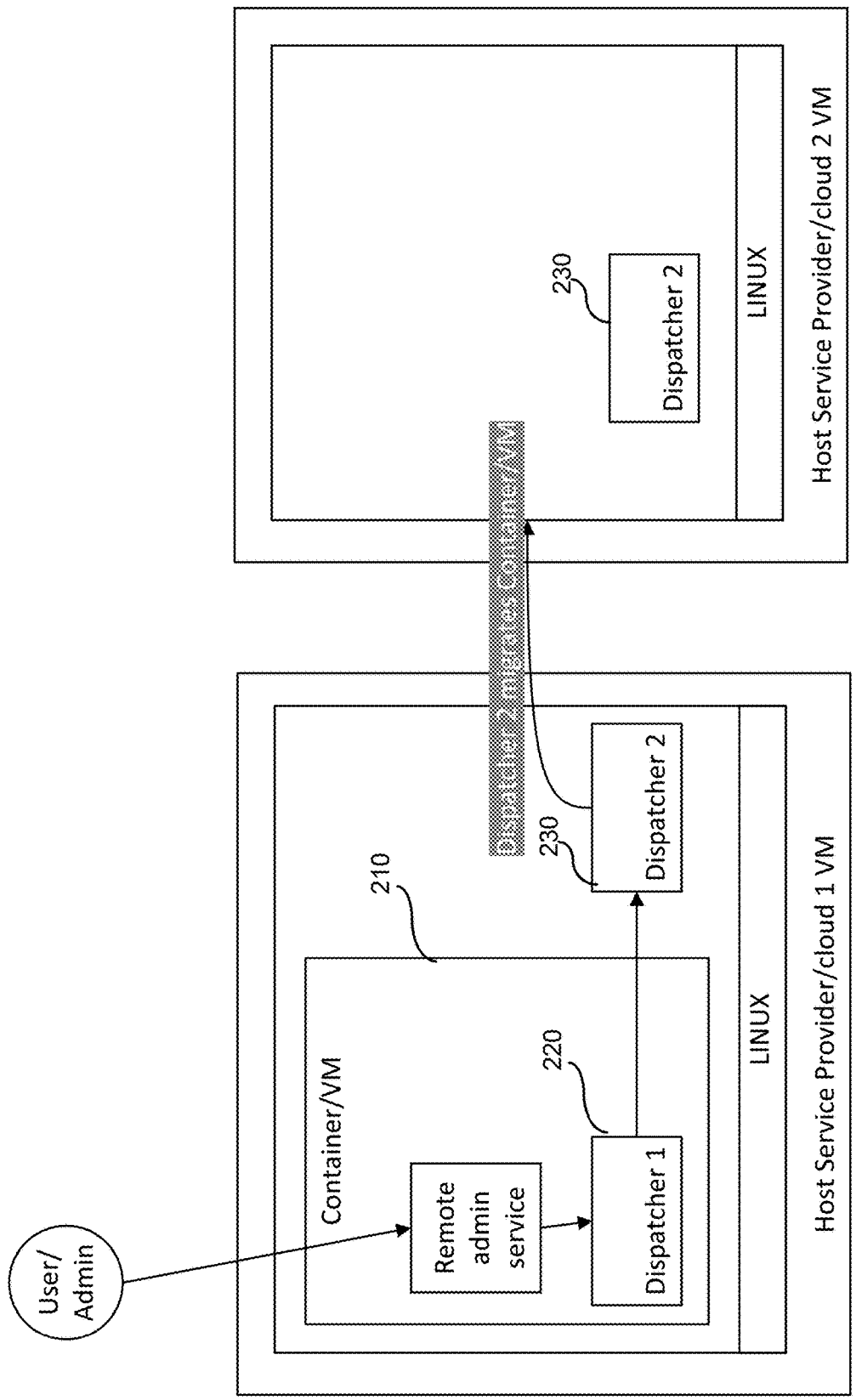
FIG. 6 illustrates the use of a dedicated VEE for migration of containers.

Another function that the dedicated VEE can provide is migration to another host, for example, to a public cloud or another hosting service provider at any time, see FIG. 6. The user send a command to the dedicated VEE to migrate to another host (e.g. to cloud). For example, with the host 110 (or a VM in other aspects) running VZLINUX (e.g., version 7—Vz7 or VzLin7, or any other OS), and a VEE (e.g. standard container or a VM) running an application, the user might want to migrate the dedicated VEE with application (which is already installed and running) to a cloud, such as to AMAZON. The dispatcher performs a hot migration of the dedicated VEE with the application (including the snapshot of the application files, relevant driver information, the state of the application's RAM and the processor registers and flags, and any other information needed for the application to run on the cloud, such as URL redirects), to the cloud, without interrupting its functioning and functioning of the application. After the migration, dedicated VEE with the application will run on the node in the cloud, FIG. 5, (or in the VM on the node in the cloud, FIG. 6). From the user's perspective, the existence of a container in which the application is initially installed and launched is transparent. Similarly, the instance of the target container in the cloud is also transparent to the user—as far as the user is concerned, all that happens is migration of the dedicated VEE with an application from a desktop or some other local machine to the cloud.

Thus, FIG. 6 illustrates a scenario where a dedicated VEE is launched inside another VEE (such as a VM). There are two dispatchers—one inside the dedicated VEE (dispatcher 1), and which is accessible to the user or an administrator (e.g. remote admin service), and one outside the dedicated VEE (dispatcher 2) (but still inside the VM, which is denoted host service provider VM on the FIG. 6), which is in charge of the actual migration process. In some aspects, dispatcher 2 does not communicate to applications running in the VM, but outside the dedicated VEE The dispatchers are in communication with each other, for example, using RPC calls or a network protocol. Upon command from the admin or user, dispatcher 1 requests migration from the dispatcher 2 (which, in some aspects, then performs migration of the dedicated VEE). The migration could be to a public cloud, a different public cloud than the current one, another host on the current cloud, or simply to a different host. The target machine also has a VM (or Container) that is configured in the same manner as the source machine (also this another VM even may have another vendor, because all user information will be in the newly created dedicated VEE and it is not important how the VM is implemented). Thus, to the dedicated VEE, the migration is transparent, and the user will not perceive any difference in operation of the dedicated VEE.

Figure 4:
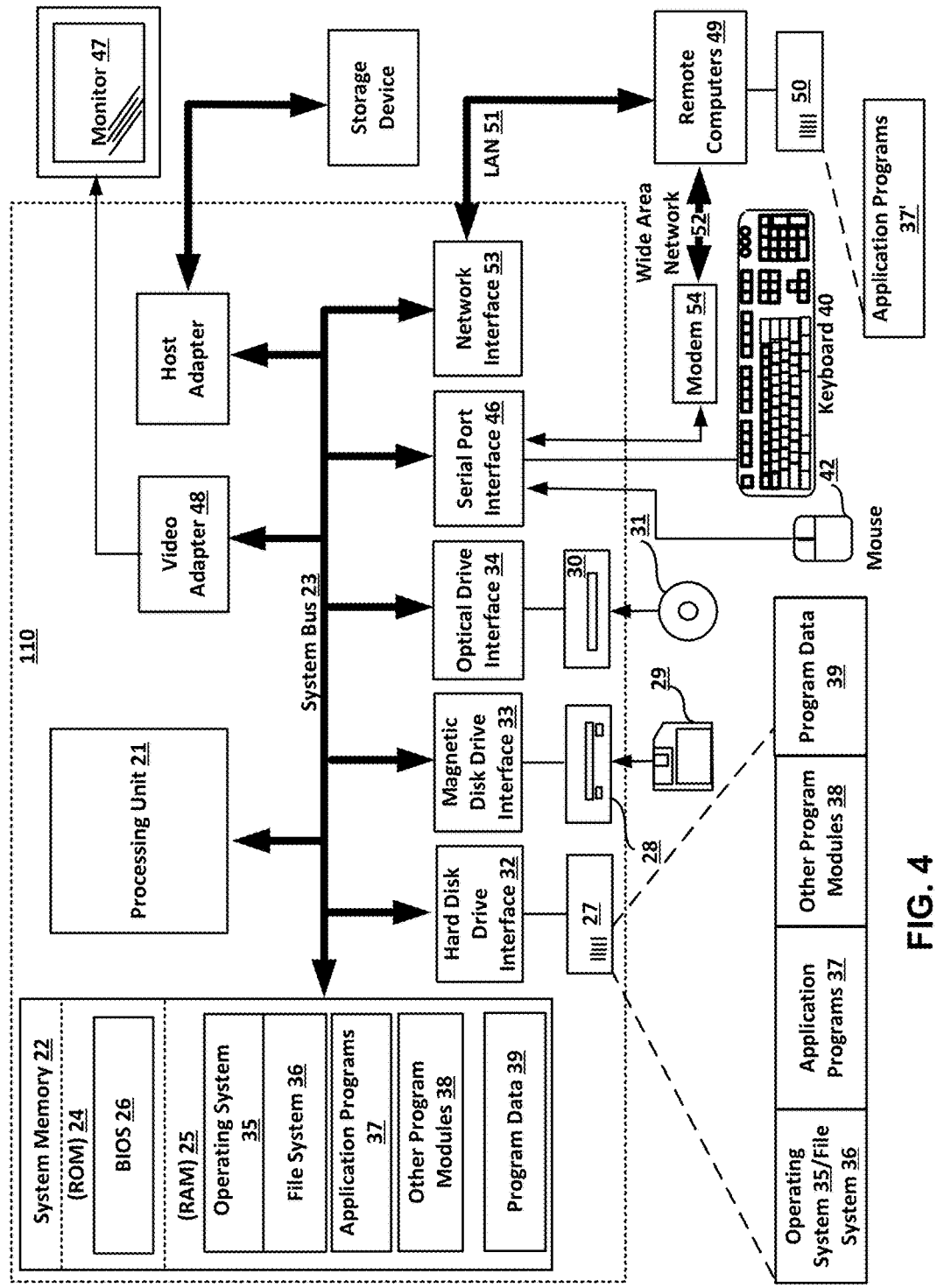
FIG. 4 illustrates a schematic of an exemplary computer system that can be used for implementation of the invention.

With reference to FIG. 4, an exemplary system for implementing the invention includes a general purpose computing device in the form of a computer system 110 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 110, such as during start-up, is stored in ROM 24.

The computer 110 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 110 includes a file system 36 associated with or included within the operating system 35, one or more application programs 37, other program modules 38 and program data 39. A user may enter commands and information into the computer 110 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 110 may operate in a networked environment using logical connections to one or more remote computers 49. The remote computer (or computers) 49 may be another computer, a server, a router, a network PC, a peer device or other common network node, and typically includes many or all of the elements described above relative to the computer 110, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 110 is connected to the local network 51 through a network interface or adapter 53. When used in a WAN networking environment, the computer 110 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 110, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

What is claimed is:

1. A computer-implemented system for migration of a Virtual Execution Environment (VEE), the system comprising:
   a host having a thin host OS and a host file system;
   a Virtual Machine (VM) running on the host;
   a dedicated hosting VEE running in the VM and executing user applications; and
   a dispatcher module running inside the dedicated hosting VEE and configured to live-migrate the dedicated hosting VEE with the executing applications from the host to another host.

2. The system of claim 1, further comprising a module for administration of other VEEs that is implemented inside the dedicated hosting VEE, while its functionality is supported by the host.

3. The system of claim 2, wherein the administration includes installing software applications inside other VEEs running under the VM.

4. The system of claim 2, wherein the administration includes setting up networking parameters of other VEEs running under the VM.

5. The system of claim 2, wherein the administration includes creating nested VEEs.

6. The system of claim 2, wherein the administration includes licensing management for software installed in other VEEs running under the VM.

7. The system of claim 1, further comprising a template module for creation of other VEEs that is implemented inside the dedicated hosting VEE.

8. The system of claim 1, further comprising a backup module in the dedicated hosting VEE.

9. The system of claim 1, wherein the dedicated hosting VEE is a VM.

10. The system of claim 1, wherein the dedicated hosting VEE is a Container.

11. The system of claim 1, wherein the thin host OS is a minimum LINUX OS comprising a basic kernel, low level libraries GLib and NetConfig.

12. The system of claim 1, wherein dispatcher processes executing inside the dedicated hosting VEE are isolated from other processes of Containers and VMs residing on the same host.

13. The system of claim 1, further comprising a user authentication module implemented inside the dedicated hosting VEE.

14. The system of claim 1, wherein an administrator can connect directly to the dispatcher module, and a remote shell access goes to the dedicated hosting VEE instead of a physical host.

15. The system of claim 1, wherein the dispatcher module is not accessible by applications running on the host or running in the VM outside the dedicated hosting VEE.

16. The system of claim 1, further comprising a second dispatcher module running inside the VM and outside the dedicated hosting VEE, the second dispatcher module being in communication with the dispatcher module inside the dedicated hosting VEE, and the second dispatcher module being configured to execute the live migration transparently to the dedicated hosting VEE.

17. The system of claim 1, wherein the another host is a public cloud.

18. The system of claim 1, wherein the dedicated hosting VEE is permitted to consume all the memory available to the VM.

19. A computer-implemented method for migration of a host Virtual Execution Environment (VEE), the method comprising:
- on a host having a Virtual Machine (VM) with a thin guest OS and a guest file system, starting a dedicated hosting VEE under the VM;
- starting a first dispatcher module inside the dedicated hosting VEE, wherein the dispatcher module is configured to interface to an administrator;
- starting user applications in the dedicated hosting VEE; and
- starting a second dispatcher module configured to live-migrate the dedicated hosting VEE with the executing applications to a host on a cloud.

20. The method of claim 19, wherein the first and second dispatcher modules are not accessible by applications running on the host.

21. The method of claim 19, wherein the first and second dispatcher modules are not accessible by applications running in the VM and outside the dedicated hosting VEE.

22. A computer-implemented system for migration of a dedicated Virtual Execution Environment (VEE), the system comprising:
- a first VM running in a public cloud;
- the first VM having a first thin guest OS and a first file system;
- a dedicated hosting VEE running on the first VM and executing user applications;
- a first dispatcher module running inside the dedicated hosting VEE, the first dispatcher module accessible to a user of the dedicated hosting VEE;
- a second dispatcher module running inside the first VM, the second dispatcher module in communication with the first dispatcher module,
- wherein the second dispatcher module is configured to live-migrate the dedicated hosting VEE with the executing user applications from the first VM to a second VM running on another public cloud, such that the migration is transparent to the dedicated hosting VEE.

23. The system of claim 22, wherein the second VM has a second thin guest OS and a second file system.

24. The system of claim 22, wherein the first dispatcher module is not accessible by the user applications running in the first VM.

* * * * *